United States Patent
Bouchy

(10) Patent No.: US 12,146,111 B2
(45) Date of Patent: Nov. 19, 2024

(54) USE OF A CATALYST BASED ON IZM-2 WITH A CONTENT OF LOW ALKALI METAL FOR THE ISOMERIZATION OF PARAFFINIC FEEDSTOCKS TO MIDDLE DISTILLATES

(71) Applicant: IFP Energies Nouvelles, Rueil-Malmaison (FR)

(72) Inventor: Christophe Bouchy, Rueil-Malmaison (FR)

( * ) Notice: Subject to any disclaimer, the term of this patent is extended or adjusted under 35 U.S.C. 154(b) by 131 days.

(21) Appl. No.: 17/785,197

(22) PCT Filed: Dec. 9, 2020

(86) PCT No.: PCT/EP2020/085217
§ 371 (c)(1),
(2) Date: Jun. 14, 2022

(87) PCT Pub. No.: WO2021/122198
PCT Pub. Date: Jun. 24, 2021

(65) Prior Publication Data
US 2023/0019569 A1    Jan. 19, 2023

(30) Foreign Application Priority Data
Dec. 17, 2019  (FR) ...................... 1914593

(51) Int. Cl.
*C10G 45/64* (2006.01)
*B01J 29/74* (2006.01)
*B01J 35/61* (2024.01)
*B01J 35/63* (2024.01)
*B01J 35/64* (2024.01)

(52) U.S. Cl.
CPC ............. *C10G 45/64* (2013.01); *B01J 29/74* (2013.01); *B01J 35/615* (2024.01); *B01J 35/635* (2024.01); *B01J 35/647* (2024.01); *C10G 2300/1011* (2013.01); *C10G 2300/1022* (2013.01)

(58) Field of Classification Search
CPC ........ B01J 29/74; B01J 35/615; B01J 35/635; B01J 35/647; C10G 2/30; C10G 3/50; C10G 45/64; C10G 45/62; C10G 2300/1011; C10G 2300/1022; Y02P 30/20
USPC ........................................ 585/734, 737, 739
See application file for complete search history.

(56) References Cited

U.S. PATENT DOCUMENTS

| | | | |
|---|---|---|---|
| 5,055,443 A | 10/1991 | Mercier et al. | |
| 7,880,043 B2 | 2/2011 | Chapus et al. | |
| 8,361,435 B2 | 1/2013 | Fecant et al. | |
| 9,156,748 B2 | 10/2015 | Bouchy et al. | |
| 9,586,828 B2 | 3/2017 | Bouchy et al. | |
| 10,906,030 B2 | 2/2021 | Bouchy | |
| 2011/0180455 A1* | 7/2011 | Bouchy .................. | C10G 47/20 208/49 |

FOREIGN PATENT DOCUMENTS

| | | |
|---|---|---|
| FR | 2934794 B1 | 10/2010 |
| FR | 2984911 B1 | 8/2014 |

OTHER PUBLICATIONS

Machine Translation of FR 2 934 794, Feb. 12, 2010, 39 pages.*
International Search report PCT/EP2020/085217 dated Dec. 23, 2020. (pp. 1-2).
Filipe Marques Mota et al: "IZM-2: A promising new zeolite for the selective hydroisomerization of long-chain n-alkanes", Journal of Catalysis., vol. 301, May 1, 2013 (May 1, 2013), US, pp. 20-29, XP055495311, ISSN: 0021-9517, DOI: 10.1016/j.jcat.2013.01.017.

* cited by examiner

*Primary Examiner* — Colin W. Slifka
(74) *Attorney, Agent, or Firm* — Millen, White, Zelano & Branigan, P.C.; Csaba Henter

(57) ABSTRACT

Process for isomerization of paraffinic feedstocks operating at a temperature of between 200° C. and 500° C., at a total pressure of between 0.45 MPa and 7 MPa, at a partial pressure of hydrogen of between 0.3 and 5.5 MPa, at an hourly space velocity of between 0.1 and 10 kg of feedstock introduced per kg of catalyst and per hour, using a catalyst having at least one group VIII metal, at least one matrix and at least one IZM-2 zeolite, the total weight content of alkali metal and/or alkaline-earth metal elements is less than 200 ppm by weight relative to the total mass of said catalyst.

13 Claims, No Drawings

USE OF A CATALYST BASED ON IZM-2 WITH A CONTENT OF LOW ALKALI METAL FOR THE ISOMERIZATION OF PARAFFINIC FEEDSTOCKS TO MIDDLE DISTILLATES

TECHNICAL FIELD

In order to meet the demand for middle distillate bases, i.e. a fraction that can be incorporated into the kerosene and/or gas oil pool, various methods for producing middle distillates based on the use of petroleum, natural gas or renewable resources may be used.

Middle distillate bases may thus be produced from a paraffinic feedstock obtained from a feedstock derived from renewable sources, and in particular from plant oils or animal fats, which are raw or which have undergone a pretreatment, and also mixtures of such feedstocks. Specifically, said feedstocks derived from renewable sources contain chemical structures of triglyceride or free fatty acid or ester type, the structure and length of the hydrocarbon-based chain of these feedstocks being compatible with the hydrocarbons present in middle distillates. Said feedstocks derived from renewable sources produce, after hydrotreatment, paraffinic feedstocks that are free of sulfur compounds and of aromatic compounds. These paraffinic feedstocks are typically composed of linear paraffins containing between 9 and 25 carbon atoms.

Middle distillate bases may also be produced from natural gas, coal or renewable sources via the Fischer-Tropsch synthetic process. In particular, the "low-temperature" Fischer-Tropsch synthesis using cobalt catalysts makes it possible to produce essentially paraffinic linear compounds having a very variable number of carbon atoms, typically from 1 to 100 carbon atoms or even more. Separation steps may make it possible to recover paraffinic feedstocks containing between 9 and 25 carbon atoms.

However, these middle distillate bases obtained after hydrotreatment of plant oils or after the low-temperature Fischer-Tropsch synthetic process generally cannot be incorporated as such into the kerosene or gas oil pool in particular on account of insufficient cold properties.

Specifically, high molecular weight paraffins which are linear or very sparingly branched and which are present in these middle distillate bases lead to high pour points and thus to congealing for uses at low temperature. For example, the pour point of a linear hydrocarbon containing 20 carbon atoms per molecule and whose boiling point is equal to about 340° C., i.e. typically within the middle distillate cut, is about +37° C., which renders its use impossible, the specification being −15° C. for gas oil. In order to lower the pour point values, these linear or very sparingly branched paraffins must be totally or partially removed.

This operation may be performed by extraction with solvents such as propane or methyl ethyl ketone, this process then being referred to as deparaffinning with propane or with methyl ethyl ketone (MEK). However, these techniques are expensive, lengthy and not always easy to perform.

Selective cracking of the longest linear paraffinic chains, which leads to the formation of compounds of lower molecular weight, part of which may be removed by distillation, constitutes a solution for reducing the flow point values. Given their shape selectivity, zeolites are among the catalysts most widely used for this type of process. The catalyst that is the most widely used in the deparaffining category by selective cracking is zeolite ZSM-5, of MFI structural type, which has three-dimensional porosity, with medium pores (aperture at 10 oxygen atoms 10MR). However, the cracking brought about in such processes leads to the formation of large amounts of products of lower molecular weights, such as butane, propane, ethane and methane, which considerably reduces the yield of desired products.

Another solution for improving the cold resistance consists in isomerizing long linear paraffins while minimizing the cracking. This may be achieved by performing a hydroisomerization process using difunctional catalysts. The difunctional catalysts involve a Brønsted acid phase (for example a zeolite) and a hydro/dehydrogenating phase (for example platinum) and generally a matrix (for example alumina). The appropriate choice of the acidic phase makes it possible to promote the isomerization of long linear paraffins and to minimize the cracking. Thus, the form selectivity of medium-pore (10MR) one-dimensional zeolites such as zeolites ZSM-22, ZSM-23, NU-10, ZSM-48 and ZBM-30 makes them particularly suitable for use for obtaining catalysts that are selective toward isomerization. These examples illustrate the continuous research performed for developing ever more effective catalysts for the isomerization of long linear paraffins, while minimizing the formation of cracking products through the use of suitable zeolites.

In addition to the selectivity toward isomerization, the activity of the catalyst is also an important parameter. Increasing the activity of the catalyst makes it possible to improve the overall operation of the process from the point of view of its productivity or of its energy consumption. It is therefore desirable to develop catalysts that are as active and selective as possible toward isomerization. The activity of difunctional isomerization catalysts is to a large extent dependent on the activity of the Brønsted acid phase (for example zeolite), and therefore on its activity, used in said catalysts. The acidity of the zeolite phase is ultimately dependent on the number of Brønsted acid sites of said phase and also on their force (C. Marcilly, catalyse acido-basique, volume 1, 2003). One means for increasing the activity of a difunctional isomerization catalyst may thus be to increase the acidity of the zeolite phase involved in said catalyst by increasing the density of acid sites of the zeolite phase, all factors being otherwise equal.

It is however also well known that, for a difunctional isomerization catalyst, the ratio between the number of sites of the hydro/dehydrogenating phase and the number of sites of the acid phase has an impact on its selectivity toward isomerization. Too great a decrease in this ratio leads to a decrease in the selectivity of the catalyst toward isomerization. This has, for example, been reported for the isomerization of n-decane on catalysts based on platinum and on zeolite USY (F. Alvarez et al., Journal of Catalysis, 162, 1996, 179). More recently, this has also been reported for the isomerization of n-hexadecane on catalysts based on platinum, on zeolite USY or on zeolite BEA (P. Mendes et al., AIChE Journal, 63, 7, 2017, 2864).

This has also been reported for the isomerization of n-hexadecane on catalysts based on platinum and on zeolite ZSM-12 (S. Mehla et al., Journal of Porous Materials, 20, 2013, 1023). The isomerization selectivity of the catalysts increases as the number of acid sites in the ZSM-12 zeolite decreases (by increasing the Si/Al ratio of the zeolite used). This increase in selectivity then takes place at the expense of the catalytic activity. Another way of improving the isomerization selectivity of the catalyst may be to partially neutralize the Brønsted acid sites of the zeolite with cations (W. Wang et al., Catalysis Science and Technology, 9, 2019, 4162).

The increase in the activity of the difunctional catalyst and the maximization of its selectivity toward isomerization therefore has contradictory requirements in terms of acid site density for the zeolite involved in the catalyst.

Recently, in its investigations, the Applicant has developed a novel zeolite, the IZM-2 zeolite as described in patent application FR 2 918 050 A, and also a process for the conversion of long paraffinic feedstocks containing between 9 and 25 carbon atoms using a catalyst comprising said IZM-2 zeolite as described in patent application FR 2 984 911A, said process making it possible to improve the selectivity toward the production of middle distillate base by limiting the production of light cracked products which cannot be incorporated in a gas oil and/or kerosene pool. In the illustrative example of patent application FR 2 984 911 A, a single IZM-2 solid having an overall Si/Al mole ratio of 53 is used in the formulation of the catalyst. This overall Si/Al mole ratio was calculated from the X-ray fluorescence characterization results. The content of alkali metals and/or alkaline-earth metals present in said catalyst is not disclosed.

Patent application FR 3 074 428 A teaches a process for preparing difunctional catalysts using an IZM-2 zeolite. Said preparation process allows both preferential localization of the hydrogenating function on the surface and/or in the microporosity of the zeolite IZM-2 and homogeneous distribution of the hydrogenating function in the catalyst. The alkali metal and/or alkaline-earth metal content in the catalysts of the examples is not disclosed.

The research work performed by the Applicant led to the discovery that, surprisingly, the use, in a process for the isomerization of a paraffinic feedstock, of a catalyst comprising at least one IZM-2 zeolite, said catalyst having a reduced alkali metal and/or alkaline-earth metal content, makes it possible to improve the activity of the catalyst while at the same time maintaining its isomerization selectivity.

One subject of the present invention relates to a process for the isomerization of paraffinic feedstocks, preferably obtained from hydrotreated plant and/or animal oils or from low-temperature Fischer-Tropsch synthesis, said process using a difunctional catalyst comprising at least one metal from group VIII of the Periodic Table of the Elements, at least one matrix and at least one IZM-2 zeolite, said catalyst being characterized in that the total weight content of alkali metal and/or alkaline-earth metal elements is less than 200 ppm by weight relative to the total mass of said catalyst, preferably less than 150 ppm, preferably less than 100 ppm, preferably less than 90 ppm by weight, preferably less than 85 ppm by weight, more preferably less than 80 ppm by weight, very preferably less than 75 ppm by weight and even more preferably less than 70 ppm by weight and greater than 20 ppm by weight and preferably greater than 30 ppm by weight.

In the continuation of the present document, the weight contents provided are considered relative to the dry mass of solid. The dry mass of solid corresponds to the mass of the solid after calcining in air for 2 hours at 1000° C. in a muffle furnace.

For the purposes of the present invention, the various embodiments presented may be used alone or in combination with each other, without any limit to the combinations when this is technically feasible.

For the purposes of the present invention, the various ranges of parameters for a given step, such as the pressure ranges and the temperature ranges, may be used alone or in combination. For example, for the purposes of the present invention, a preferred range of pressure values can be combined with a more preferred range of temperature values.

SUMMARY OF THE INVENTION

The present invention relates to a process for the isomerization of paraffinic feedstocks operating at a temperature of between 200° C. and 500° C., at a total pressure of between 0.45 MPa and 7 MPa, at a partial pressure of hydrogen of between 0.3 and 5.5 MPa, at an hourly space velocity of between 0.1 and 10 kg of feedstock introduced per kg of catalyst and using a catalyst comprising and preferably constituted of at least one metal from group VIII of the Periodic Table of the Elements, at least one matrix and at least one IZM-2 zeolite, said catalyst being characterized in that the total weight content of alkali metal and/or alkaline-earth metal elements is less than 200 ppm by weight relative to the total mass of said catalyst, preferably less than 150 ppm, preferably less than 200 ppm by weight relative to the total mass of said catalyst, preferably less than 150 ppm, preferably less than 100 ppm, preferably less than 90 ppm by weight, preferably less than 85 ppm by weight, more preferably less than 80 ppm by weight, very preferably less than 75 ppm by weight and even more preferably less than 70 ppm by weight and greater than 20 ppm by weight and preferably greater than 30 ppm by weight.

One advantage of the present invention is to provide a process for the isomerization of a paraffinic feedstock using a catalyst comprising at least one IZM-2 zeolite, said catalyst having a reduced alkali metal and/or alkaline-earth metal content, making it possible to improve the activity of the catalyst while at the same time maintaining maximum isomerization selectivity.

Throughout the rest of the text, the total weight content of alkali metal and/or alkaline-earth metal in said catalyst is measured by atomic absorption spectroscopy on a Varian Spectr'AA 240FS Flame Atomic Absorption Spectrometer (FAAS) after dissolving the solid by wet mineralization of said solid. The term "mineralization of the solid" means the dissolution of said solid, which is typically performed in concentrated aqueous solutions of perchloric, hydrofluoric and hydrochloric acids. It may be performed at elevated temperature on a hotplate or by microwave.

DESCRIPTION OF THE EMBODIMENTS

In accordance with the invention, the present invention relates to a process for the isomerization of paraffinic feedstocks operating at a temperature of between 200° C. and 500° C., at a total pressure of between 0.45 MPa and 7 MPa, at a partial pressure of hydrogen of between 0.3 and 5.5 MPa, at an hourly space velocity of between 0.1 and 10 kg of feedstock introduced per kg of catalyst and per hour and using a catalyst comprising at least one metal from group VIII of the Periodic Table of the Elements, at least one matrix and at least one IZM-2 zeolite, said catalyst being characterized in that the total weight content of alkali metal and/or alkaline-earth metal elements is less than 200 ppm by weight relative to the total mass of said catalyst, preferably less than 150 ppm, preferably less than 100 ppm by weight relative to the total mass of said catalyst, preferably less than 90 ppm by weight, preferably less than 85 ppm by weight, more preferably less than 80 ppm by weight, very preferably less than 75 ppm by weight and even more preferably less than 70 ppm by weight and greater than 20 ppm by weight and preferably greater than 30 ppm by weight.

The Isomerization Process

In accordance with the invention, the isomerization process is performed at a temperature of between 200° C. and 500° C., at a total pressure between 0.45 MPa and 7 MPa, at a partial pressure of hydrogen of between 0.3 and 5.5 MPa, at an hourly space velocity of between 0.1 and 10 kilograms of feedstock introduced per kilogram of catalyst and per hour. Preferably, said process is performed at a temperature of between 200 and 450° C., and more preferably between 220 and 430° C., at a total pressure of between 0.6 and 6 MPa, at a partial pressure of hydrogen of between 0.4 and 4.8 MPa, at an hourly space velocity advantageously of between 0.2 and 7 $h^{-1}$ and preferably between 0.5 and 5 $h^{-1}$.

According to the invention, the isomerization process comprises bringing a paraffinic feedstock into contact with at least said catalyst according to the invention present in a catalytic reactor.

The paraffins of said paraffinic feedstock contain between 9 and 25 carbon atoms, preferably between 10 and 25 and very preferably between 10 and 22. The paraffin content in said feedstock used in the process according to the invention is advantageously greater than 90% by weight, preferably greater than 95% by weight and even more preferably greater than 98% by weight. Within said paraffins, the mass percentage of isoparaffins is less than 15%, preferably less than 10% and very preferably less than 5%.

According to a first embodiment, said paraffinic feedstock used in the process according to the invention is produced from renewable resources.

Preferably, said paraffinic feedstock is produced from renewable resources chosen from plant oils, oils from algae or algal oils, fish oils and fats of plant or animal origin, or mixtures of such feedstocks.

Said plant oils may advantageously be totally or partly raw or refined, and derived from plants chosen from rapeseed, sunflower, soybean, palm, olive, coconut, coconut kernel, castor oil plant, cotton, groundnut oil, linseed oil and sea kale oil, and all oils derived, for example, from sunflower or from rapeseed by genetic modification or hybridization, this list not being limiting. Said animal fats are advantageously chosen from blubber and fats composed of residues from the food industry or derived from the catering industries. Frying oils, various animal oils, such as fish oils, tallow or lard, can also be used.

The renewable resources from which is produced the paraffinic feedstock used in the process according to the invention essentially contain chemical structures of triglyceride type which a person skilled in the art also knows by the name fatty acid triester, and also free fatty acids, the fatty chains of which contain between 9 and 25 carbon atoms.

The hydrocarbon chain structure and length of these fatty acids are compatible with the hydrocarbons present in gas oil and kerosene, i.e. the middle distillate cut. A fatty acid triester is thus composed of three fatty acid chains. These fatty acid chains in triester form or in free fatty acid form have a number of unsaturations per chain, also known as the number of carbon-carbon double bonds per chain, generally between 0 and 3, but which may be higher notably for oils derived from algae which generally contain from 5 to 6 unsaturations per chain.

The molecules present in said renewable resources used in the present invention thus have a number of unsaturations, expressed per triglyceride molecule, advantageously between 0 and 18. In these feedstocks, the degree of unsaturation, expressed as the number of unsaturations per hydrocarbon fatty chain, is advantageously between 0 and 6.

The renewable resources generally also include various impurities and notably heteroatoms such as nitrogen. The nitrogen contents in plant oils are generally between 1 ppm and 100 ppm by weight approximately, depending on their nature. They may be up to 1% by weight for particular feedstocks.

Said paraffinic feedstock used in the process according to the invention is advantageously produced from renewable resources according to processes known to those skilled in the art. One possible method is catalytic transformation of said renewable resources into deoxygenated paraffinic effluent in the presence of hydrogen, and in particular hydrotreatment.

Preferably, said paraffinic feedstock is produced by hydrotreatment of said renewable resources. These processes for the hydrotreatment of renewable resources are already well known and are described in numerous patents. By way of example, said paraffinic feedstock used in the process according to the invention may advantageously be produced, preferably by hydrotreatment and then by gas/liquid separation, from said renewable resources, for instance as in patent FR 2 910 483 or in patent FR 2 950 895.

According to a second embodiment, said paraffinic feedstock used in the process according to the invention may also be a paraffinic feedstock produced via a process involving a step of upgrading via the Fischer-Tropsch route. In the Fischer-Tropsch process, synthesis gas (CO+H2) is converted catalytically into oxygenated products and into essentially linear hydrocarbons in gaseous, liquid or solid form. Said products obtained constitute the feedstock of the process according to the invention. Synthesis gas (CO+H2) is advantageously produced from natural gas, coal, biomass, any source of hydrocarbon-based compounds or a mixture of these sources. Thus, the paraffinic feedstocks obtained, according to a Fischer-Tropsch synthetic process, from a synthesis gas (CO+H2) produced from renewable resources, natural gas or coal may be used in the process according to the invention. Preferably, said paraffinic feedstock produced by Fischer-Tropsch synthesis and used in the process according to the invention predominantly comprises n-paraffins. Thus, said feedstock comprises a content of n-paraffins of greater than 60% by weight relative to the total mass of said feedstock. Said feedstock may also comprise a content of oxygenated products preferably of less than 10% by weight, a content of unsaturated substances, that is to say preferably olefinic products, preferably of less than 20% by weight, and a content of isoparaffins preferably of less than 10% by weight relative to the total mass of said feedstock.

Very preferably, said feedstock comprises a content of n-paraffins of greater than 70% by weight and even more preferably greater than 80% by weight relative to the total mass of said feedstock. The paraffins of said paraffinic feedstock contain between 9 and 25 carbon atoms, preferably between 10 and 25 and very preferably between 10 and 22.

Preferably, said paraffinic feedstock produced by Fischer-Tropsch synthesis is free of heteroatomic impurities, for instance sulfur, nitrogen or metals.

Catalyst

The present invention relates to the use of a catalyst comprising, and preferably constituted by, at least one IZM-2 zeolite preferably containing silicon atoms and optionally aluminum atoms, at least one matrix and at least one metal from group VIII of the Periodic Table of the Elements, said catalyst being characterized in that the total weight content of alkali metal and/or alkaline-earth metal elements in said catalyst is less than 200 ppm by weight and greater than 20 ppm by weight relative to the total mass of said catalyst.

Preferably, said catalyst has a total weight content of alkali metal and/or alkaline-earth metal elements of less than 150 ppm by weight relative to the total mass of said catalyst, preferably less than 100 ppm, preferably less than 90 ppm, preferably less than 85 ppm by weight, preferably less than 80 ppm by weight, more preferably less than 75 ppm by weight and even more preferably less than 70 ppm by weight and preferably greater than 30 ppm by weight.

The alkali metal and/or alkaline-earth metal elements are preferably chosen from lithium, sodium, potassium, beryllium, magnesium, barium and calcium, preferably sodium and potassium and very preferably sodium.

Preferably, said catalyst has a total weight content of sodium element of less than 150 ppm by weight relative to the total mass of said catalyst, preferably less than 100 ppm, preferably less than 90 ppm, preferably less than 85 ppm by weight, preferably less than 80 ppm by weight, more preferably less than 75 ppm by weight and even more preferably less than 70 ppm by weight and greater than 20 ppm by weight and preferably greater than 30 ppm by weight.

Preferably, said catalyst does not comprise any added alkali metal and/or alkaline-earth metal elements, other than those associated with the zeolite and/or with the matrix used in said catalyst.

Said catalyst according to the invention advantageously comprises, and preferably is constituted of:
from 1% to 90% by weight, preferably from 3% to 80% by weight, more preferably from 4% to 60% and even more preferably from 6% to 50% by weight of IZM-2 zeolite relative to the total mass of the catalyst according to the invention,
from 0.01% to 5% by weight, preferably between 0.1% and 4% by weight and very preferably between 0.1% and 2% by weight of at least one metal from group VIII of the Periodic Table of the Elements, preferably platinum, relative to the total mass of the catalyst,
optionally from 0.01% to 2% and preferably from 0.05% to 1% by weight of at least one additional metal chosen from the group formed by the metals from groups IIIA, IVA and VIIB, relative to the total mass of the catalyst,
optionally a sulfur content, preferably such that the ratio of the number of moles of sulfur to the number of moles of the group VIII metal(s) is between 0.3 and 3,
a total weight content of alkali metal and/or alkaline-earth metal elements of less than 200 ppm relative to the total mass of said catalyst, preferably less than 150 ppm, preferably less than 100 ppm, preferably less than 90 ppm by weight, preferably less than 85 ppm by weight, preferably less than 80 ppm by weight, very preferably less than 75 ppm by weight and even more preferably less than 70 ppm by weight and greater than 20 ppm by weight and preferably greater than 30 ppm by weight,
at least one matrix, preferably alumina, providing the remainder to 100% in the catalyst.

IZM-2 Zeolite

In accordance with the invention, the catalyst comprises an IZM-2 zeolite. IZM-2 zeolite has an X-ray diffraction diagram which includes at least the lines recorded in Table 1. IZM-2 zeolite has a crystalline structure.

Advantageously, the diffraction diagram is obtained by radiocrystallographic analysis by means of a diffractometer using the conventional powder method with the $K_{\alpha 1}$ radiation of copper ($\lambda$=1.5406 Å). On the basis of the position of the diffraction peaks represented by the angle 2θ, the lattice constant distances $d_{hkl}$ characteristic of the sample are calculated using the Bragg relationship. The measurement error $\Delta(d_{hkl})$ on $d_{hkl}$ is calculated by means of the Bragg relationship as a function of the absolute error $\Delta(2\theta)$ assigned to the measurement of 2θ. An absolute error $\Delta(2\theta)$ equal to ±0.02° is commonly accepted. The relative intensity $I_{rel}$ assigned to each value of $d_{hkl}$ is measured according to the height of the corresponding diffraction peak. The X-ray diffraction diagram of the IZM-2 zeolite contained in the catalyst according to the invention includes at least the lines at the values of $d_{hkl}$ given in Table 1. In the column of the $d_{hkl}$ values, the mean values of the interplanar spacings are given in Angströms (Å). Each of these values must be assigned the measurement error $\Delta(d_{hkl})$ of between ±0.6 Å and ±0.01 Å.

Table 1 represents the mean values of $d_{hkl}$ and relative intensities measured on an X-ray diffraction diagram of the calcined IZM-2 crystalline solid

| 2 theta (°) | $d_{hkl}$ (Å) | $I_{rel}$ |
|---|---|---|
| 5.07 | 17.43 | vw |
| 7.36 | 12.01 | VS |
| 7.67 | 11.52 | VS |
| 8.78 | 10.07 | S |
| 10.02 | 8.82 | vw |
| 12.13 | 7.29 | vw |
| 14.76 | 6.00 | vw |
| 15.31 | 5.78 | vw |
| 15.62 | 5.67 | vw |
| 16.03 | 5.52 | vw |
| 17.60 | 5.03 | vw |
| 18.22 | 4.87 | vw |
| 19.01 | 4.66 | vw |
| 19.52 | 4.54 | vw |
| 21.29 | 4.17 | m |
| 22.44 | 3.96 | w |
| 23.10 | 3.85 | mw |
| 23.57 | 3.77 | w |
| 24.65 | 3.61 | vw |
| 26.78 | 3.33 | w |
| 29.33 | 3.04 | vw |
| 33.06 | 2.71 | vw |
| 36.82 | 2.44 | vw |
| 44.54 | 2.03 | vw | where VS=very strong; S=strong; m=medium; mw=moderately weak; w=weak; vw=very weak.

The relative intensity $I_{rel}$ is given as a relative intensity scale in which a value of 100 is attributed to the most intense line in the X-ray diffraction diagram: vw<15; 15≤w<30; 30≤mw<50; 50≤m<65; 65≤S<85; VS≥85.

Said solid IZM-2 advantageously has a chemical composition expressed on an anhydrous basis, in terms of moles of oxides, defined by the following general formula: XO2: aY2O3:bM2/nO, in which X represents at least one tetravalent element, Y represents at least one trivalent element and M is at least one alkali metal and/or alkaline-earth metal of the valency n. In said formula given above, a represents the number of moles of Y2O3 and a is between 0 and 0.5, very preferentially between 0 and 0.05 and even more preferably between 0.0016 and 0.02 and b represents the number of moles of M2/nO and is between 0 and 1, preferably between 0 and 0.5 and even more preferably between 0.005 and 0.5.

Preferably, X is chosen from silicon, germanium, titanium and a mixture of at least two of these tetravalent elements; very preferentially, X is silicon and Y is preferentially chosen from aluminum, boron, iron, indium and gallium; very preferentially, Y is aluminum. M is preferentially chosen from lithium, sodium, potassium, calcium, magnesium and a mixture of at least two of these metals, and very preferentially M is sodium. Preferably, X represents silicon, said crystalline solid IZM-2 is then an entirely silicic solid when the element Y is absent from the composition of said solid IZM-2. It is also advantageous to use as element X a mixture of several elements X, in particular a mixture of silicon with another element X chosen from germanium and titanium, preferably germanium. Thus, when silicon is present as a mixture with another element X, the crystalline solid IZM-2 is then a crystalline metallosilicate having an X-ray diffraction diagram identical to that described in Table 1 when it is in its calcined form. Even more preferably and in the presence of an element Y, X being silicon and Y being aluminum: said crystalline solid IZM-2 is then a crystalline aluminosilicate having an X-ray diffraction diagram identical to that described in Table 1 when it is in its calcined form.

More generally, said solid IZM-2 used in the support of the catalyst implemented in the process according to the invention advantageously has a chemical composition expressed by the general formula (I) below: $XO_2:aY_2O_3: bM_{2/n}O:cR:dH_2O$ in which R represents an organic species including two quaternary nitrogen atoms, X represents at least one tetravalent element, Y represents at least one trivalent element and M is an alkali metal and/or alkaline-earth metal of valency n; a, b, c and d representing, respectively, the number of moles of $Y_2O_3$, $M_{2/n}O$, R and $H_2O$ and a is between 0 and 0.5, b is between 0 and 1, c is between 0 and 2 and d is between 0 and 2. This formula and the values taken by a, b, c and d are those for which said solid IZM-2 is preferentially in its calcined form.

More precisely, said solid IZM-2, in its raw synthetic form, advantageously has a chemical composition expressed by the following general formula: $XO_2:aY_2O_3:bM_{2/n}O:cR: dH_2O$ (I) in which R represents an organic species including two quaternary nitrogen atoms, X represents at least one tetravalent element, Y represents at least one trivalent element and M is an alkali metal and/or alkaline-earth metal of valency n; a, b, c and d representing, respectively, the number of moles of $Y_2O_3$, $M_{2/n}O$, R and $H_2O$ and a is between 0 and 0.5, b is between 0 and 1, c is between 0.005 and 2 and preferably between 0.01 and 0.5, and d is between 0.005 and 2 and preferably between 0.01 and 1.

In formula (I) given above to define the chemical composition of said crystalline solid IZM-2 in its raw synthetic form, the value of a is between 0 and 0.5, very preferentially between 0 and 0.05 and even more preferably between 0.0016 and 0.02. Preferably, b is between 0 and 1, very preferably b is between 0 and 0.5 and even more preferably b is between 0.005 and 0.5. The value of c is between 0.005 and 2, advantageously between 0.01 and 0.5. The value taken by d is between 0.005 and 2, preferably between 0.01 and 1.

In its crude synthetic form, i.e. obtained directly from the synthesis and prior to any calcination step well known to those skilled in the art, said solid IZM-2 advantageously includes at least the organic species R containing two quaternary nitrogen atoms such as that described hereinbelow, or the decomposition products thereof or precursors thereof. According to a preferred embodiment of the invention, in formula (I) given above, the element R is 1,6-bis (methylpiperidinium)hexane. Said organic species R, which acts as structuring agent, may be removed via the conventional routes known in the prior art, such as thermal and/or chemical treatments.

A process for preparing IZM-2 zeolite is taught in patent FR 2 918 050 B incorporated herein by reference.

Advantageously, in the case where X is silicon and Y is aluminum, an aqueous mixture including at least one source of at least one oxide $SiO_2$, optionally at least one source of at least one oxide $Al_2O_3$, optionally at least one source of at least one alkali metal and/or alkaline-earth metal of valency n, and preferably at least one organic species R including two quaternary nitrogen atoms, is reacted, the mixture preferentially having the following molar composition:

$SiO_2/Al_2O_3$: at least 2, preferably at least 20, more preferably from 60 to 600, $H_2O/SiO_2$: 1 to 100, preferably from 10 to 70, $R/SiO_2$: 0.02 to 2, preferably from 0.05 to 0.5, $M_{2/n}O/SiO_2$: 0 to 1, preferably from 0.005 to 0.5, where M is one or more alkali metals and/or alkaline-earth metals chosen from lithium, sodium, potassium, calcium and magnesium, and a mixture of at least two of these metals; preferably, M is sodium. Advantageously, the element R is 1,6-bis(methylpiperidinium)hexane.

The Si/Al mole ratio of IZM-2 zeolite may also be adjusted to the desired value via methods of post-treatment of the IZM-2 zeolite obtained after synthesis. Such methods are known to those skilled in the art and make it possible to perform dealumination or desilication of the zeolite. Preferably, the Si/Al mole ratio of the IZM-2 zeolite included in the composition of the catalyst according to the invention is adjusted by means of a suitable choice of the conditions for synthesis of said zeolite.

Among the IZM-2 zeolites, it is usually preferred to use IZM-2 zeolites in which the silicon/aluminum (Si/Al) overall atomic ratio is greater than about 3 and more preferably IZM-2 zeolites in which the Si/Al ratio is between 5 and 200 and even more preferably between 10 and 150.

Thus, according to a preferred embodiment of the process for preparing said crystalline solid IZM-2, an aqueous mixture including silicon oxide, optionally alumina, 1,6-bis (methylpiperidinium)hexane dibromide and sodium hydroxide is reacted. According to another preferred embodiment of the process according to the invention, an aqueous mixture including silicon oxide, optionally alumina and 1,6-bis(methylpiperidinium)hexane dihydroxide is reacted.

The process for preparing said crystalline solid IZM-2 advantageously consists in preparing an aqueous reaction mixture, called a gel, containing at least one source of at least one oxide $XO_2$, optionally at least one source of at least one oxide $Y_2O_3$, at least one organic species R, optionally at least one source of at least one alkali metal and/or alkaline-earth metal of the valency n. The amounts of said reagents are advantageously adjusted so as to give this gel a composition enabling its crystallization as a crystalline solid IZM-2 in its crude synthetic form of general formula (I) $XO_2:aY_2O_3:bM_{2/n}O:cR:dH_2O$, in which a, b, c and d meet the criteria defined above when c and d are greater than 0. The gel is then subjected to a hydrothermal treatment until said crystalline solid IZM-2 forms. The gel is advantageously placed under hydrothermal conditions at an autogenous reaction pressure, optionally with addition of gas, for example nitrogen, at a temperature of between 120° C. and 200° C., preferably between 140° C. and 180° C. and even more preferably between 160 and 175° C., until crystals of solid IZM-2 in its crude synthetic form have formed. The time required to obtain crystallization generally ranges between 1 hour and several months as a function of the composition of the reagents in the gel, the stirring and the reaction temperature. Preferably, the crystallization time ranges between 2 hours and 21 days. The reaction is generally performed with or without stirring, preferably with stirring.

It may be advantageous to add seeds to the reaction mixture in order to reduce the time required for formation of the crystals and/or the total crystallization time. It may also be advantageous to use seeds in order to promote the formation of said crystalline solid IZM-2 at the expense of impurities. Such seeds advantageously comprise crystalline solids, notably solid IZM-2 crystals. The crystalline seeds are generally added in a proportion of between 0.01% and 10% of the mass of the oxide XO2 used in the reaction mixture.

On conclusion of the hydrothermal treatment step leading to the crystallization of said solid IZM-2, the solid phase is advantageously filtered, washed, dried and then calcined. The calcination step is advantageously performed via one or more heating steps performed at a temperature of between 100 and 1000° C., preferably between 400 and 650° C., for a time of between a few hours and several days, preferably between 3 hours and 48 hours. Preferably, the calcination is performed in two consecutive heating steps.

On conclusion of said calcination step, said solid IZM-2 obtained is advantageously the one having the X-ray diffraction diagram including at least the lines recorded in Table 1. It is free of water and also of the organic species R present in the solid IZM-2 in its crude synthetic form. After said calcination step, the IZM-2 zeolite may typically contain from 2000 to 8000 ppm of alkali metal and/or alkaline-earth metal element and preferably of sodium.

After calcination, so as to reduce the content of alkali metal and/or alkaline-earth metal and preferably of sodium, in said zeolite, the solid IZM-2 included in the composition of the support for the catalyst according to the invention is advantageously washed by means of at least one treatment with a solution of at least one ammonium salt so as to obtain the ammonium form of the solid IZM-2. The M/Y atomic ratio is generally advantageously less than 0.1, preferably less than 0.05 and even more preferably less than 0.01. This washing step may be performed at any step in the preparation of the support for the catalyst or of the catalyst, i.e. after the step of preparing the solid IZM-2, after the step of forming the solid IZM-2, or after the step of introducing the hydro-dehydrogenating metal. Preferably, the washing step is performed after the step of forming the solid IZM-2. The washing step is preferably performed by immersion with stirring of the solid in an aqueous solution of at least one ammonium salt. The ammonium salt may be chosen from ammonium nitrate NH4NO3, ammonium chloride NH4Cl, ammonium hydroxide NH4OH, ammonium bicarbonate NH4HCO3, ammonium acetate NH4H3C2O2 or ammonium sulfate (NH4)2SO4. The duration of immersion of the solid in the solution may typically range from 15 minutes to several hours. The concentration of ammonium salt(s) in the solution is typically between 0.1 mol per liter and 10 mol per liter. The washing is preferably performed at a temperature between ambient temperature and 100° C. The ratio between the volume of solution engaged (in ml) and the mass of zeolite engaged (in g) is preferably between 1 and 100. To reduce the content of alkali metal and/or alkaline-earth metal and preferably of sodium to the desired level, it may prove necessary to repeat the washing step several times. On conclusion of the final wash, the solid is filtered off, washed with deionized water and then dried. The IZM-2 zeolite is finally calcined so as to obtain it in its protonic form. The calcination conditions are typically the same as those used for calcining the solid on conclusion of the hydrothermal treatment step.

After washing, the zeolite may typically contain less than 200 ppm and preferably more than 20 ppm or even more than 30 ppm of alkali metal and/or alkaline-earth metal element and preferably of sodium.

Matrix

In accordance with the invention, the catalyst comprises at least one matrix. Said matrix may advantageously be amorphous or crystalline.

Preferably, said matrix is advantageously chosen from the group formed by alumina, silica, silica-alumina, clays, titanium oxide, boron oxide and zirconia, taken alone or as a mixture, or else aluminates may also be chosen. Preferably, alumina is used as matrix. Preferably, said matrix contains alumina in all its forms known to those skilled in the art, for instance aluminas of alpha, gamma, eta and delta type. Said aluminas differ in their specific surface area and their pore volume. The alkali metal and/or alkaline-earth metal content of the matrix is variable and depends on the method for obtaining said matrix, as is well known for alumina, for example (Handbook of Porous Solids, 2008, Wiley-VCH chapter 4.7.2).

The support for the catalyst used in the invention comprises and is preferably constituted by said matrix and of said IZM-2 zeolite.

The alkali metal and/or alkaline-earth metal element content of the matrix may advantageously be adjusted via any method known to those skilled in the art for obtaining a catalyst in accordance with the invention. The matrix or the matrix precursor may thus be washed by placing it in contact with an aqueous solution whose pH is less than or equal to the point of zero charge of said matrix, as is illustrated for an alumina matrix in Catalysis Supports and Supported Catalysts, Butterworth Publishers (1987). By way of illustration, boehmite may be washed by placing said solid in contact with aqueous ammonium nitrate solution. The duration of immersion of the solid in the solution may typically range from 15 minutes to several hours. The concentration of ammonium salt(s) in the solution is typically between 0.1 mol per liter and 10 mol per liter. The washing is preferably performed at a temperature between ambient temperature and 100° C. The ratio between the volume of solution engaged (in ml) and the mass of boehmite engaged (in g) is preferably between 1 and 100. To reduce the content of alkali metal and/or alkaline-earth metal to the desired level, it may prove necessary to repeat the washing step several times. On conclusion of the final wash, the solid is filtered off, washed with deionized water and then dried and calcined.

When it contains alkali metal and/or alkaline-earth metal elements, the matrix may typically contain less than 200 ppm and preferably more than 20 ppm or even more than 30 ppm of alkali metal and/or alkaline-earth metal element and preferably of sodium.

Metal Phase

In accordance with the invention, the catalyst comprises at least one group VIII metal preferably chosen from iron, cobalt, nickel, ruthenium, rhodium, palladium, osmium, iridium and platinum, preferably chosen from the noble metals of group VIII, very preferably chosen from palladium and platinum and even more preferably platinum is chosen.

Preferably, said catalyst comprises a content of group VIII metal of between 0.01% and 5% by weight relative to the total mass of said catalyst and preferably between 0.1% and 4% by weight.

In the case where said catalyst comprises at least one noble metal from group VIII, the content of noble metal of said catalyst is advantageously between 0.01% and 5% by weight, preferably between 0.1% and 4% by weight and very preferably between 0.1% and 2% by weight relative to the total mass of said catalyst.

The catalyst of the invention may also advantageously contain at least one metal chosen from the metals of groups IIIA, IVA and VIIB chosen from gallium, indium, tin and rhenium. In this case, the content of metal chosen from the metals of groups IIIA, IVA and VIIB is preferably between 0.01% and 2%, preferably between 0.05% and 1% by weight relative to the total weight of said catalyst.

The dispersion of the group VIII metal(s), determined by chemisorption, for example by H2/O2 titration or by carbon monoxide chemisorption, is between 10% and 100%, preferably between 20% and 100% and more preferably between 30% and 100%. The macroscopic distribution coefficient for the metal(s) of group VIII, obtained from its (their) profile determined with a Castaing microprobe, defined as the ratio of the concentrations of the metal(s) of group VIII at the core of the grain relative to at the edge of this same grain, is between 0.7 and 1.3 and preferably between 0.8 and 1.2. The value of this ratio, in the region of 1, is evidence of the homogeneity of distribution of the metal(s) of group VIII in the catalyst.

Preparation of the Catalyst

The catalyst according to the invention may advantageously be prepared according to any of the methods well known to those skilled in the art.

Forming

Advantageously, the various constituents of the support of the catalyst can be formed by means of a blending step so as to form a paste, then extrusion of the paste obtained, or else by mixing powders then pelletizing, or else by any other known process for agglomeration of a powder containing alumina. The supports thus obtained may be in various shapes and sizes. Preferably, the forming is performed by blending and extrusion.

During the forming of the support by blending and then extrusion, said IZM-2 zeolite may be introduced during the dissolution or suspension of the alumina compounds or alumina precursors, for instance boehmite. Said IZM-2 zeolite may be, for example, without this being limiting, in the form of a powder, a ground powder, a suspension, or a suspension which has undergone a deagglomeration treatment. Thus, for example, said zeolite may advantageously be placed in acidified or non-acidified suspension at a concentration adjusted to the final IZM-2 content targeted in the catalyst according to the invention. This suspension commonly referred to as a slip is then mixed with the alumina compounds or alumina precursors.

Moreover, the use of additives may advantageously be performed to facilitate the forming and/or to improve the final mechanical properties of the supports, as is well known to those skilled in the art. Examples of additives that may notably be mentioned include cellulose, carboxymethylcellulose, carboxyethylcellulose, tall oil, xanthan gums, surfactants, flocculants such as polyacrylamides, carbon black, starches, stearic acid, polyacryl alcohol, polyvinyl alcohol, biopolymers, glucose, polyethylene glycols, etc.

Water may advantageously be added or removed to adjust the viscosity of the paste to be extruded. This step may advantageously be performed at any stage in the blending step.

To adjust the solids content of the paste to be extruded so as to make it extrudable, a compound that is predominantly solid, preferably an oxide or a hydrate, may also be added. A hydrate is preferably used, and even more preferably an aluminum hydrate. The loss on ignition of this hydrate is advantageously greater than 15%.

Extrusion of the paste derived from the blending step may advantageously be performed with any conventional commercially available tool. The paste derived from the blending is advantageously extruded through a die, for example using a piston or a single-screw or twin-screw extruder. The extrusion may advantageously be performed via any method known to those skilled in the art.

The catalyst supports according to the invention are generally in the form of cylindrical extrudates or polylobal extrudates such as bilobal, trilobal or polylobal extrudates of straight or twisted form, but may optionally be manufactured and used in the form of crushed powders, lozenges, rings, beads and/or wheels. Preferably, the catalyst supports according to the invention are in the form of spheres or extrudates. Advantageously, the support is in the form of extrudates with a diameter of between 0.5 and 5 mm and more particularly between 0.7 and 2.5 mm. The forms may be cylindrical (which may or may not be hollow) and/or twisted and/or multilobal (for example 2, 3, 4 or 5 lobes) cylindrical and/or annular. The multilobal form is advantageously preferably used.

Drying

The support thus obtained may then be subjected to a drying step. Said drying step is advantageously performed via any technique known to those skilled in the art.

Preferably, the drying is performed under a stream of air. Said drying may also be performed under a stream of any oxidizing, reducing or inert gas. Preferably, the drying is advantageously performed at a temperature of between 50 and 180° C., preferably between 60 and 150° C. and very preferably between 80 and 130° C.

Calcination

Said support, optionally dried, then preferably undergoes a calcination step.

Said calcination step is advantageously performed in the presence of molecular oxygen, for example by flushing with air, at a temperature advantageously greater than 200° C. and less than or equal to 1100° C. Said calcination step may advantageously be performed in a cross-flow bed, in a licked bed or under a static atmosphere. For example, the oven used may be a rotary oven or may be a vertical oven with radial cross-flow layers. Preferably, said calcination step is performed for between more than one hour at 200° C. and less than one hour at 1100° C. The calcination may advantageously be performed in the presence of steam and/or in the presence of an acidic or basic vapour. For example, the calcination may be performed under a partial pressure of ammonia.

Post-Calcination Treatments

Post-calcination treatments may optionally be performed, so as to improve the properties of the support, notably the textural properties.

Thus, the catalyst support according to the present invention may be subjected to a hydrothermal treatment in a confined atmosphere. The term "hydrothermal treatment in a confined atmosphere" means a treatment in an autoclave in the presence of water at a temperature above ambient temperature, preferably above 25° C., preferably above 30° C.

In the course of this hydrothermal treatment, the support may advantageously be impregnated, prior to its treatment in the autoclave (the autoclaving being done either in the vapour phase or in the liquid phase, this vapour or liquid phase of the autoclave possibly being acidic or not). This impregnation, prior to autoclaving, may advantageously be acidic or not. This impregnation, prior to autoclaving, may advantageously be performed dry or by immersing the support in an acidic aqueous solution. The term "dry impregnation" means placing the support in contact with a volume of solution less than or equal to the total pore volume of the support. Preferably, the impregnation is performed dry. The autoclave is preferably a rotating-basket autoclave such as the one defined in patent application EP 0 387 109 A. The temperature during the autoclaving may be between 100 and 250° C. for a period of time of between 30 minutes and 3 hours.

The formed mixture of the matrix and of IZM-2 zeolite constitutes the support for the catalyst. The alkali metal and/or alkaline-earth metal content of the support may also be adjusted via any method known to those skilled in the art for obtaining a catalyst in accordance with the invention.

Preferably, washing treatments may also be performed in order to reduce the alkali metal and/or alkaline-earth metal content of the support. The operating conditions of the washing are typically the same as those described for the washing of the zeolite. The support is then calcined again after washing, preferably under the same conditions as those described for the washing of the zeolite.

Deposition of the Metal Phase

For the deposition of the metal from group VIII of the Periodic Table of the Elements, any deposition technique known to those skilled in the art and any precursor of such metals may be suitable for use. Use may be made of the deposition techniques by dry impregnation or excess impregnation of a solution containing the precursors of the metals, in the presence or absence of competitors. The introduction of the metal may be performed in any step of the preparation of the catalyst: on the IZM-2 zeolite and/or on the matrix, notably before the forming step, during the forming step, or after the forming step, on the support for the catalyst. Preferably, the deposition of the metal is performed after the forming step.

The control of certain parameters used during the deposition, in particular the nature of the precursor of the group VIII metal(s) used, makes it possible to direct the deposition of said metal(s) predominantly on the matrix or on the zeolite.

Thus, to introduce the group VIII metal(s), preferentially platinum and/or palladium, predominantly on the matrix, an anionic exchange may be performed with hexachloroplatinic acid and/or hexachloropalladic acid, preferably in the presence of a competing agent, for example hydrochloric acid, the deposition generally being followed by calcination, for example at a temperature of between 350 and 550° C., and for a period of between 1 and 4 hours. With such precursors, the group VIII metal(s) are deposited predominantly on the matrix and said metal(s) show(s) good dispersion and good macroscopic distribution through the catalyst grain.

It is also possible to envisage depositing the group VIII metal(s), preferentially platinum and/or palladium, by cationic exchange such that said metal(s) are predominantly deposited on the zeolite. Thus, in the case of platinum, the precursor may be chosen, for example, from:
 ammoniacal compounds such as platinum(II) tetramine salts of formula Pt(NH3)4X2; platinum(IV) hexamine salts of formula Pt(NH3)6X4; platinum(IV) halopentamine salts of formula (PtX(NH3)5)X3; platinum N-tetrahalodiamine salts of formula PtX4(NH3)2; and halogenated compounds of formula H(Pt(acac)2X);
 X being a halogen chosen from the group formed by chlorine, fluorine, bromine and iodine, X preferably being chlorine, and "acac" representing the acetylacetonate group (of empirical formula C5H7O2), derived from acetylacetone. With such precursors, the group VIII metal(s) are deposited predominantly on the zeolite and said metal(s) show(s) good dispersion and good macroscopic distribution through the catalyst grain.

The impregnation solution may also advantageously comprise at least one ammonium salt chosen from ammonium nitrate NH4NO3, ammonium chloride NH4Cl, ammonium hydroxide NH4OH, ammonium bicarbonate NH4HCO3 and ammonium acetate NH4H3C2O2, alone or as a mixture, the mole ratio between the ammonium salt and the noble metal of the precursor being between 0.1 and 400.

In the case where the catalyst of the invention also contains at least one metal chosen from the metals from groups IIIA, IVA and VIIB, any technique for deposition of such a metal that are known to those skilled in the art and any precursor of such metals may be suitable for use.

The group VIII metal(s) and that (those) of groups IIIA, IVA and VIIB may be added either separately or simultaneously in at least one unit step. When at least one metal from groups IIIA, IVA and VIIB is added separately, it is preferable for it to be added after the group VIII metal.

The additional metal chosen from the metals from groups IIIA, IVA and VIIB may be introduced by means of compounds such as, for example, chlorides, bromides and nitrates of the metals from groups IIIA, IVA and VIIB. For example, in the case of indium, the nitrate or the chloride is advantageously used, and, in the case of rhenium, perrhenic acid is advantageously used. The additional metal chosen from the metals from groups IIIA, IVA and VIIB may also be introduced in the form of at least one organic compound chosen from the group constituted by complexes of said metal, in particular polyketone complexes of the metal and hydrocarbylmetals such as alkyl, cycloalkyl, aryl, alkylaryl and arylalkyl metals. In the latter case, the introduction of the metal is advantageously performed using a solution of the organometallic compound of said metal in an organic solvent. Organohalogen compounds of the metal may also be used. Organic compounds of metals that may be mentioned in particular include tetrabutyltin, in the case of tin, and triphenylindium, in the case of indium.

If the additional metal chosen from the metals from groups IIIA, IVA and VIIB is introduced before the metal from group VIII, the compound of the IIIA, IVA and/or VIIB metal used is generally chosen from the group constituted by the halide, nitrate, acetate, tartrate, carbonate and oxalate of the metal. The introduction is then advantageously performed in an aqueous solution. However, it may also be introduced using a solution of an organometallic compound of the metal, for example tetrabutyltin. In this case, before introducing at least one group VIII metal, calcination in air will be performed.

Furthermore, intermediate treatments, for instance calcination and/or reduction, may be applied between the successive depositions of the various metals.

Before its use in an isomerization process, the catalyst according to the invention is preferably reduced. This reduction step is advantageously performed by treatment under hydrogen at a temperature of between 150° C. and 650° C. at a total pressure of between 0.1 and 25 MPa. For example, a reduction consists of a stage at 150° C. for two hours and then a temperature increase to 450° C. at a rate of 1° C./minute, and then a stage of two hours at 450° C.; throughout this reduction step, the hydrogen flow rate is 1000 normal m3 of hydrogen per tonne of catalyst and the total pressure is kept constant at 0.2 MPa. Any ex-situ reduction method may advantageously be envisaged. Prior reduction of the final catalyst ex-situ, under a stream of hydrogen, may be performed, for example at a temperature of from 450° C. to 600° C., for a time of from 0.5 to 4 hours.

Said catalyst also advantageously comprises sulfur. In the case where the catalyst of the invention contains sulfur, said sulfur may be introduced at any step in the preparation of the catalyst: before or after the forming and/or drying and/or calcination step, before or after the introduction of the metal(s) mentioned previously, or alternatively by in-situ and/or ex-situ sulfurization before the catalytic reaction. In the case of in-situ sulfurization, the reduction, if the catalyst has not been reduced beforehand, takes place before the sulfurization. In the case of ex-situ sulfurization, the reduction is also performed, followed by sulfurization. The sulfurization is preferably performed in the presence of hydrogen using any sulfurizing agent that is well known to those skilled in the art, for instance dimethyl sulfide or hydrogen sulfide.

The catalysts according to the invention are in various shapes and sizes. They are generally used in the form of cylindrical extrudates and/or polylobal extrudates such as bilobal, trilobal or polylobal extrudates of straight and/or twisted form, but may optionally be manufactured and used in the form of crushed powders, lozenges, rings, beads and/or wheels. Preferably, the catalysts used in the process according to the invention are in the form of spheres or extrudates. Advantageously, the catalyst is in the form of extrudates with a diameter of between 0.5 and 5 mm and more particularly between 0.7 and 2.5 mm. The forms may be cylindrical (which may or may not be hollow) and/or twisted and/or multilobal (for example 2, 3, 4 or 5 lobes) cylindrical and/or annular. The multilobal form is advantageously preferably used. The metal deposit does not change the form of the support.

The following examples illustrate the invention without, however, limiting the scope thereof.

EXAMPLES

Example 1: Synthesis of IZM-2 Zeolite

IZM-2 zeolite was synthesized in accordance with the teaching of patent FR 2 918 050 B. A colloidal silica suspension known under the trade name Ludox HS-40, sold by Aldrich, is incorporated into a solution composed of sodium hydroxide (Prolabo), 1,6-bis(methylpiperidinium) hexane dibromide structuring agent, aluminum hydroxide (Aldrich) and deionized water. The molar composition of the mixture is as follows: 1 $SiO_2$; 0.0042 $Al_2O_3$; 0.1666 $Na_2O$; 0.1666 1,6-bis(methylpiperidinium)hexane; 33.3333 $H_2O$. The mixture is stirred vigorously for 30 minutes. The mixture is then transferred, after homogenization, into a Parr autoclave. The autoclave is heated for 5 days at 170° C. with spindle stirring (30 rpm). The product obtained is filtered, washed with deionized water to reach neutral pH and then dried overnight at 100° C. in an oven. The solid is then introduced into a muffle furnace and calcined so as to remove the structuring agent. The calcination cycle comprises a temperature rise up to 200° C., a stage of two hours at this temperature, a temperature rise up to 550° C., followed by a stage of eight hours at this temperature and finally a return to ambient temperature. The temperature rises are performed with a gradient of 2° C./minute. The solid thus obtained after calcination has a sodium content, measured by atomic absorption, of 3695 ppm.

To reduce the sodium content, the solid thus obtained is then refluxed for 2 hours in an aqueous ammonium nitrate solution (10 ml of solution per gram of solid, ammonium nitrate concentration of 3M). This refluxing step is performed four times with fresh ammonium nitrate solution, and the solid is then filtered off, washed with deionized water and dried in an oven overnight at 100° C. Finally, to obtain the zeolite in its acid (protonated H+) form, a step of calcination is performed at 550° C. for 10 hours (temperature increase rate of 2° C./minute) in a cross-flow bed under dry air (2 normal liters per hour and per gram of solid). The solid thus obtained was analyzed by X-ray diffraction and identified as being constituted by IZM-2 zeolite. The solid thus obtained has a sodium content, measured by atomic absorption, of 142 ppm.

Example 2: Preparation of a First IZM-2/Alumina Support

The IZM-2/alumina support is obtained by blending and extrusion of the IZM-2 zeolite prepared in Example 1 with a first batch of boehmite supplied by the company Axens, containing 287 ppm by weight of sodium. The blended paste is extruded through a trilobal die 1.8 mm in diameter. After drying in an oven overnight at 110° C., the extrudates are calcined at 550° C. for two hours (temperature increase rate of 5° C./minute) in a cross-flow bed under dry air (2 normal liters per hour and per gram of solid). The support does not undergo a washing step. The weight content of IZM-2 zeolite in the support after calcination is 24% by weight. The sodium content in the support, measured by atomic absorption, is 252 ppm by weight.

Example 3 (not in Accordance with the Invention): Preparation of an Isomerization Catalyst A Catalyst A is a catalyst comprising an IZM-2 zeolite, platinum and an alumina matrix. This catalyst is prepared by dry impregnation of the IZM-2/alumina support prepared in Example 2 with an aqueous solution containing platinum tetramine nitrate $Pt(NH_3)_4(NO_3)_2$. 20 g of support are typically used, and are dry-impregnated in a rotating barrel. After impregnation, the solid is left to mature for at least five hours in the laboratory air and is then dried overnight in an oven at 110° C. and, finally, a calcination step is performed under a flow of dry air (1 normal liter per hour and per gram of solid) in a tubular oven under the following conditions:

temperature rise from ambient temperature to 150° C. at 5° C./min, stage of 1 hour at 150° C., rise from 150° C. to 450° C. at 5° C./min, stage of 1 hour at 450° C., decrease to ambient temperature.

The Pt content measured by XRF on the calcined catalyst is 0.3% by weight relative to the total mass of said catalyst, and its coefficient of distribution measured by Castaing microprobe is 0.6. The catalyst obtained is not subjected to a step of washing with ammonium nitrate solution. The sodium weight content in the catalyst, measured by atomic absorption, is 255 ppm.

The textural properties of catalyst A were characterized by nitrogen porosimetry at 196° C. on a Micromeritics ASAP 2010 machine. Before nitrogen adsorption, the solid is degassed under vacuum at 90° C. for 1 hour and then at 350° C. for 4 hours. The total pore volume corresponds to the volume of nitrogen adsorbed at a relative pressure of 0.97. The specific surface area of the solid is calculated by means of the BET method and the median pore diameter calculated according to the BJH adsorption model corresponds to the diameter for which half of the volume of nitrogen is adsorbed. Catalyst A has a specific surface area of 294 m²/g, a total pore volume of 0.64 ml/g and a median diameter of 14 nm.

Example 4: Preparation of a Second IZM-2/Alumina Support

This support is obtained by washing the first IZM-2/alumina support described in Example 2. The IZM-2/alumina support described in Example 2 is washed with an aqueous ammonium nitrate solution. The support is placed in contact with an aqueous ammonium nitrate solution in a conical flask on a shaker for 24 hours. The volume of solution is set at 8 ml per gram of support and the concentration of ammonium nitrate is set at 0.15 M. After 24 hours, the solution is drawn off and the solid is then rinsed with twice the exchange volume of distilled water and then dried overnight in an oven at 110° C. The solid is then calcined in a cross-flow bed under dry laboratory air (1 normal liter per hour and per gram of solid) in a tubular furnace under the following conditions:
temperature rise from ambient temperature to 150° C. at 5° C./min,
stage of 1 hour at 150° C.,
rise from 150° C. to 250° C. at 5° C./min,
stage of 1 hour at 250° C.,
rise from 250° C. to 350° C. at 5° C./min,
stage of 1 hour at 350° C.,
rise from 350° C. to 520° C. at 5° C./min,
stage of two hours at 520° C.;
decrease to ambient temperature.
The sodium content in the support, measured by atomic absorption, is 40 ppm by weight.

Example 5 (in Accordance with the Invention): Preparation of an Isomerization Catalyst B Catalyst B is a catalyst comprising an IZM-2 zeolite, platinum and an alumina matrix. This catalyst is prepared by dry impregnation of the IZM-2/alumina support prepared in Example 4 with an aqueous solution containing platinum tetramine nitrate Pt(NH3)4(NO3)2. 20 g of support are typically used, and are dry-impregnated in a rotating barrel. After impregnation, the solid is left to mature for at least five hours in the laboratory air and is then dried overnight in an oven at 110° C. and, finally, a calcination step is performed under a flow of dry air (1 normal liter per hour and per gram of solid) in a tubular oven under the following conditions:
temperature increase from ambient temperature to 150° C. at 5° C./min;
stage of 1 hour at 150° C.;
rise from 150° C. to 450° C. at 5° C./min,
stage of 1 hour at 450° C.;
decrease to ambient temperature.
The Pt content measured by XRF on the calcined catalyst is 0.3% by weight relative to the total mass of catalyst, and its coefficient of distribution measured by Castaing microprobe is 0.5. The catalyst obtained is not subjected to a step of washing with ammonium nitrate solution. The sodium content in the catalyst, measured by atomic absorption, is 42 ppm by weight.

The textural properties of catalyst B were characterized by nitrogen porosimetry at 196° C. on a Micromeritics ASAP 2010 machine. Before nitrogen adsorption, the solid is degassed under vacuum at 90° C. for 1 hour and then at 350° C. for 4 hours. The total pore volume corresponds to the volume of nitrogen adsorbed at a relative pressure of 0.97. The specific surface area of the solid is calculated by means of the BET method and the median pore diameter calculated according to the BJH adsorption model corresponds to the diameter for which half of the volume of nitrogen is adsorbed. Catalyst B has a specific surface area of 300 m²/g, a total pore volume of 0.65 ml/g and a median diameter of 13 nm.

Example 6 (in Accordance with the Invention): Preparation of an Isomerization Catalyst C Catalyst C is a catalyst comprising a zeolite IZM-2, platinum and an alumina matrix. Catalyst D is a catalyst comprising a zeolite IZM-2, platinum and an alumina matrix. This catalyst is prepared by excess impregnation of the IZM-2/alumina support prepared in Example 2 with an aqueous solution containing hexachloroplatinic acid. The concentration of hexachloroplatinic acid in the solution is $2.55 \times 10^{-3}$ mol/l.

20 g of support are used, the pore volume of which is filled with distilled water and the solid is left to mature for one hour at ambient temperature. The solid is then immersed in 80 ml of a hydrochloric acid HCl solution of concentration $3.52 \times 10^{-1}$ mol/l in a conical flask, and the whole is then stirred on a shaker (100 rpm) at ambient temperature for one hour. The hydrochloric acid solution is then removed and the solid is immersed in 80 ml of the hexachloroplatinic acid solution described previously, and the whole is then stirred on a shaker (100 rpm) at ambient temperature for 24 hours. The impregnation solution is then removed and the solid is rinsed with 160 ml of distilled water. The solid is then dried in a ventilated oven overnight at 110° C. and, finally, a calcination step is performed under a flow of dry air (2 normal liters per hour and per gram of solid) in a tubular oven under the following conditions:
temperature rise from ambient temperature to 500° C. at 5° C./min,
stage of two hours at 500° C.;
decrease to ambient temperature.
The Pt content measured by XRF on the calcined catalyst is 0.2% by weight relative to the total mass of catalyst, and its coefficient of distribution measured by Castaing microprobe is 1.0. The catalyst obtained is not subjected to a step of washing with ammonium nitrate solution. The sodium content in the catalyst, measured by atomic absorption, is 180 ppm by weight.

The textural properties of catalyst C were characterized by nitrogen porosimetry at 196° C. on a Micromeritics ASAP 2010 machine. Before nitrogen adsorption, the solid is degassed under vacuum at 90° C. for 1 hour and then at 350° C. for 4 hours. The total pore volume corresponds to the volume of nitrogen adsorbed at a relative pressure of 0.97. The specific surface area of the solid is calculated by means of the BET method and the median pore diameter calculated according to the BJH adsorption model corresponds to the diameter for which half of the volume of nitrogen is adsorbed. Catalyst C has a specific surface area of 292 m²/g, a total pore volume of 0.65 ml/g and a median diameter of 14 nm.

Example 7 (in Accordance with the Invention): Preparation of an Isomerization Catalyst D Catalyst D is a catalyst comprising a zeolite IZM-2, platinum and an alumina matrix. Catalyst D is a catalyst comprising a zeolite IZM-2, platinum and an alumina matrix. This catalyst is prepared by excess impregnation of the IZM-2/alumina support prepared in Example 4 with an aqueous solution containing hexachloroplatinic acid. The concentration of hexachloroplatinic acid in the solution is $2.55 \times 10^{-3}$ mol/l.

20 g of support are used, the pore volume of which is filled with distilled water and the solid is left to mature for one hour at ambient temperature. The solid is then immersed in 80 ml of a hydrochloric acid HCl solution of concentration $3.52 \times 10^{-1}$ mol/l in a conical flask, and the whole is then stirred on a shaker (100 rpm) at ambient temperature for one hour. The hydrochloric acid solution is then removed and the solid is immersed in 80 ml of the hexachloroplatinic acid solution described previously, and the whole is then stirred on a shaker (100 rpm) at ambient temperature for 24 hours. The impregnation solution is then removed and the solid is rinsed with 160 ml of distilled water. The solid is then dried in a ventilated oven overnight at 110° C. and, finally, a calcination step is performed under a flow of dry air (2 normal liters per hour and per gram of solid) in a tubular oven under the following conditions:

temperature rise from ambient temperature to 500° C. at 5° C./min,
stage of two hours at 500° C.,
decrease to ambient temperature.

The Pt content measured by XRF on the calcined catalyst is 0.2% by weight relative to the total mass of the catalyst, and its coefficient of distribution measured by Castaing microprobe is 1.0. The catalyst obtained is not subjected to a step of washing with ammonium nitrate solution. The sodium content in the catalyst, measured by atomic absorption, is 37 ppm by weight.

The textural properties of catalyst D were characterized by nitrogen porosimetry at 196° C. on a Micromeritics ASAP 2010 machine. Before nitrogen adsorption, the solid is degassed under vacuum at 90° C. for 1 hour and then at 350° C. for 4 hours. The total pore volume corresponds to the volume of nitrogen adsorbed at a relative pressure of 0.97. The specific surface area of the solid is calculated by means of the BET method and the median pore diameter calculated according to the BJH adsorption model corresponds to the diameter for which half of the volume of nitrogen is adsorbed. Catalyst D has a specific surface area of 285 m²/g, a total pore volume of 0.65 ml/g and a median diameter of 13 nm.

Example 8: Evaluation of the Catalytic Properties of Catalysts C, B and D in Accordance with the Invention and a not in Accordance with the Invention, in the Isomerization of a Paraffinic Feedstock The catalysts were tested in the isomerization of a paraffinic feedstock composed of n-hexadecane. The tests were performed in a micro-unit using a fixed-bed reactor and working in a descending stream without recycling. The analysis of the hydrocarbon-based effluents is performed online by gas chromatography. Once charged into the unit, the catalyst undergoes a first step of drying under nitrogen under the following conditions:

nitrogen flow rate: 2 normal liters per hour and per gram of catalyst,
total pressure: 0.1 MPa,
temperature increase rate from ambient temperature to 150° C.: 5° C./min,
stage at 150° C. for 30 minutes.

After drying, the nitrogen is replaced with hydrogen and a step of reduction under a flow of pure hydrogen is then performed under the following conditions:

hydrogen flow rate: 5 normal liters per hour and per gram of catalyst,
total pressure: 1.1 MPa,
temperature increase rate from 150 to 450° C.: 5° C./min,
stage at 450° C. for 1 hour.

After the reduction step, the temperature is reduced to 230° C. and the catalyst is placed in contact with n-hexadecane under the following conditions:

hourly space velocity of 2 grams of n-hexadecane per hour and per gram of catalyst,
partial pressure of hydrogen of 1.0 MPa,
total pressure of 1.1 MPa.

The conversion is modified by varying the temperature; and at each temperature stage, two analyses of the effluent are performed, which makes it possible to calculate the catalytic performance and to check the stability of the catalytic performance for said temperature stage. Typically, the temperature is varied between 230 and 350° C. in temperature stages of 5° C. The analysis of the effluents is performed integrally by means of an online GC system. The temperature required to reach 50% conversion serves as a descriptor of the activity of the catalyst, while the maximum yield of hexadecane isomers obtained serves as a descriptor of the isomerizing properties of the catalyst.

Table 2 represents the catalytic performance qualities of catalysts A, B, C and D in the hydroconversion of n-hexadecane.

| Catalyst | A (non-compliant) | B (compliant) | C (compliant) | D (compliant) |
| --- | --- | --- | --- | --- |
| Pt content (wt %) | 0.3 | 0.3 | 0.2 | 0.2 |
| Na content (wt %) | 255 | 42 | 180 | 37 |
| Temperature at 50% conversion (° C.) | 275 | 264 | 265 | 257 |
| Max yield of isomers (weight %) | 85 | 85 | 83 | 83 |

Catalysts A and B differ only in their residual sodium content, while the deposition protocol and the amount of platinum deposited are the same. It is observed that the decrease in the sodium content from 255 ppm to 42 ppm in the catalyst makes it possible to significantly improve its catalytic activity: the temperature necessary to reach 50% conversion is 11° C. lower for catalyst B than for catalyst A. Remarkably, the isomerization selectivity of the two catalysts is the same since the maximum yield of isomers is identical (85%). The decrease in the sodium content makes it possible to increase the catalytic activity while at the same time maintaining the isomerization properties of the catalyst.

Catalysts C and D differ only in their residual sodium content, while the deposition protocol and the amount of platinum deposited are the same. It is observed that the decrease in the sodium content from 180 ppm to 37 ppm in the catalyst makes it possible to significantly improve its catalytic activity: the temperature necessary to reach 50% conversion is 8° C. lower for catalyst B than for catalyst A. Remarkably, the isomerization selectivity of the two catalysts is the same since the maximum yield of isomers is identical (83%). The decrease in the sodium content makes it possible to increase the catalytic activity while at the same time maintaining the isomerization properties of the catalyst.

The Pt deposition modes and the Pt contents deposited on catalysts A and B and on catalysts C and D are different. It is observed that, independently of the Pt deposition mode and of its content on the catalyst, the decrease of the sodium content on the catalyst has the same effect: increase of the catalytic activity and conservation of the isomerizing properties.

The invention claimed is:

1. A process for the isomerization of paraffinic feedstocks produced from renewable resources containing between 10 and 22 carbon atoms, operating at a temperature of between 200° C. and 500° C., at a total pressure of between 0.45 MPa and 7 MPa, at a partial pressure of hydrogen of between 0.3 and 5.5 MPa, at an hourly space velocity of between 0.1 and 10 kilograms of feedstock introduced per kilogram of catalyst per hour and using a catalyst comprising at least one metal from group VIII of the Periodic Table of the Elements, at least one matrix and at least one zeolite IZM-2, said metal being deposited by impregnation of anionic precursor, hexachloroplatinic acid and/or hexachloropalladic acid, in the presence of a competing agent hydrochloric acid or by impregnation of a cationic precursor, said catalyst being characterized in that the total weight content of alkali metal and/or alkaline-earth metal elements is less than 200 ppm by weight relative to the total mass of said catalyst, and greater than 20 ppm by weight relative to the total mass of said catalyst.

2. The isomerization process as claimed in claim 1, in which the paraffinic feedstock produced from renewable resources is selected from the group consisting of plant oils, oils from algae, algal oils, fish oils, fats of plants, fats of animal origin, and mixtures thereof.

3. The process as claimed in claim 1, in which the paraffinic feedstock has been produced by hydrotreatment of the renewable resources.

4. The process as claimed in claim 1, in which the paraffinic feedstock has been produced by a Fischer-Tropsch process.

5. The process as claimed in claim 1, in which the catalyst has a total weight content of alkali metal and/or alkaline-earth metal elements of less than 150 ppm by weight relative to the total mass of the catalyst.

6. The process as claimed in claim 5, in which the catalyst has a total weight content of alkali metal and/or alkaline-earth metal elements of less than 100 ppm by weight relative to the total mass of said catalyst.

7. The process as claimed in claim 6, in which the catalyst has a total weight content of alkali metal and/or alkaline-earth metal elements of less than 90 ppm by weight relative to the total mass of said catalyst.

8. The process as claimed in claim 7, in which the catalyst has a total weight content of alkali metal and/or alkaline-earth metal elements of less than 80 ppm by weight relative to the total mass of said catalyst.

9. The process as claimed in claim 7, in which the catalyst has a total weight content of alkali metal and/or alkaline-earth metal elements of less than 70 ppm by weight relative to the total mass of said catalyst.

10. The process as claimed in claim 1, in which the alkali metal and/or alkaline-earth metal elements are selected from the group consisting of lithium, sodium, potassium, beryllium, magnesium, barium and calcium.

11. The process as claimed in claim 1, in which the group VIII element is platinum.

12. The process as claimed in claim 1, in which said matrix is selected from the group consisting of alumina, silica, silica-alumina, clays, titanium oxide, boron oxide, zirconia and mixtures thereof.

13. The process as claimed in claim 1, in which the alkali metal and/or alkaline-earth metal element is sodium.

* * * * *